United States Patent [19]

Stanley et al.

[11] Patent Number: 5,684,924
[45] Date of Patent: Nov. 4, 1997

[54] USER ADAPTABLE SPEECH RECOGNITION SYSTEM

[75] Inventors: Barbara Ann Stanley, Lexington; Mary-Marshall Teel, Watertown; Susan Rousmaniere Avery, Westford; Vladimir Sejnoha, Cambridge, all of Mass.

[73] Assignee: Kurzweil Applied Intelligence, Inc., Waltham, Mass.

[21] Appl. No.: 444,391

[22] Filed: May 19, 1995

[51] Int. Cl.$^6$ .................................................. G10L 5/00
[52] U.S. Cl. ................................. 395/2.42; 395/2.53
[58] Field of Search .............................. 395/2.6, 2.49, 395/2.47, 2.61, 2.39, 2.45, 2.64, 2.5, 2.31, 2.52, 2.53, 2.42

[56] References Cited

U.S. PATENT DOCUMENTS 5,008,941  4/1991  Sejnoha ........................ 395/2.31
5,127,055  6/1992  Larkey ......................... 395/2.53
5,231,670  7/1993  Goldhor et al. ................ 395/2.84

OTHER PUBLICATIONS

"Building Better Wizards", User Interface Engineering, Dec. 1994.

*Primary Examiner*—Krista M. Zele
*Assistant Examiner*—Scott Wolinsky
*Attorney, Agent, or Firm*—Henry D. Pahl, Jr.

[57] ABSTRACT

A speech recognition system is disclosed which comprises a core speech recognition program and a plurality of utility program modules for adjusting various recognition parameters such as gain, sensitivity and acceptance threshold and for improving the training of word models. The system further provides a decision tree and utility controlling program module which can be invoked by a user confronting problems during the running of the core program. The system utilizes user input to traverse the decision tree and to initiate appropriate ones of the utility program modules thereby to alter the on-going behavior of the core recognition program.

8 Claims, 4 Drawing Sheets

USER ADAPTABLE SPEECH RECOGNITION SYSTEM

BACKGROUND OF THE INVENTION

1. Field of the Invention

The present invention relates to speech recognition systems and more particularly to a speech recognition system which facilitates the adjustment, by a non-technical user, of operating parameters of the system and of the training or selection of word models and thereby alter the on-going operating behavior of the recognition system itself.

2. Description of the Prior Art

While it is conventional to provide, with various application programs, a HELP file or even a so-called Wizard which guides an unfamiliar user through the operation of the functionality of the program, these prior aids have not been entirely successful in facilitating user interaction with speech recognition programs. The basic problem with these prior art approaches is that they provide aid or guidance in enabling the user to control the functionality or operation of the application program but they do not basically affect or tune the on-going operation of the program itself. For example, there are so-called Wizards which aid a user in creating a chart using a spread sheet program or in generating structured reports. In each case, however, the behavior of the underlying application program remains unchanged.

Unlike typical application programs, a speech recognition program must, to some extent, be tailored to a particular user and his environment in order to provide the highest accuracy of recognition and general ease of operation. Non-technical users can easily be confused about the effects of various adjustments and their impact on recognition results. For example, a user may be easily confused between gain and sensitivity. As understood by those skilled in the art, but not typically by users, gain is the amplification provided between the input microphone and the conversion to digital values which typically precedes any analysis of an input utterance while the term "sensitivity" is typically used to describe a controlled parameter which defines a discrimination level between background noise levels and sound levels which will be accepted as an utterance. Likewise, non-technical users may experience confusion between the sensitivity parameter and a threshold parameter. The threshold parameter is applied after scoring of models against an utterance to exclude the presumably unlikely models from being transferred to an application program, e.g. a word processor. As is understood by those skilled in the art, large vocabulary speech recognition systems typically employ one or more coarse preselection stages to narrow the field of vocabulary models before performing a detailed or high accuracy analysis of the reduced field of models.

Non-technical users may also not recognize when their personal speaking characteristics are interfering with recognition so that it is appropriate to re-train one or more word models in the vocabulary or, in some cases, to actually delete models to aid discrimination between a pair of confusable words.

While utility program modules for adjusting the operating parameters of a speech recognition program are typically provided with that program, the selection of which utility program to run in order to improve performance may be obscured even though the individual utility programs have user interfaces which aid the user in accomplishing the specific tasks performed by that utility.

Among the several objects of the present invention may be noted the provision of a novel, user-friendly speech recognition system; the provision of such a system which facilitates the adjustment of on-going system operating parameters by a user; the provision of such a system which allows a user to identify a problem which he has encountered during operation of the speech recognition system and to transparently invoke one or more utility programs to make corresponding changes in the on-going operation of the core speech recognition program; the provision of such a system which facilitates re-training of word models when user input identifies problems arising from mismatch of vocabulary models with the user's speech characteristics; the provision of such a system which allows a user to improve the discrimination between an identified pair of words; the provision of such a system which is easy to use, which is highly reliable and which is of relatively simple and inexpensive implementation. Other objects and features will be in part apparent and in part pointed out hereinafter.

SUMMARY OF THE INVENTION

In a speech recognition system in accordance with the present invention, an input utterance from a user is provided to input means which provides an adjustable amplitude gain which is applied both to the input utterance and to background noise. The system incorporates a core recognition program which compares an input utterance with a multiplicity of trained word models and generates scores for each of at least a portion of the models. The core program has adjustable operating parameters, including a sensitivity parameter which controls discrimination level between background noise and sound levels accepted as an utterance and a threshold parameter for scores. The system also includes a plurality of primary utility program modules which respond to user input to change system parameters, e.g. the gain, sensitivity and threshold parameter. A training utility program module is also incorporated which responds to user input to further train a selected word model on the basis of a particular user's voice characteristics. A decision tree and utility controlling program module can be invoked by a user who confronts problems during running of the core program and this module utilizes user input to traverse the decision tree and to initiate a corresponding utility program module thereby to alter the on-going operating behavior of the core program.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
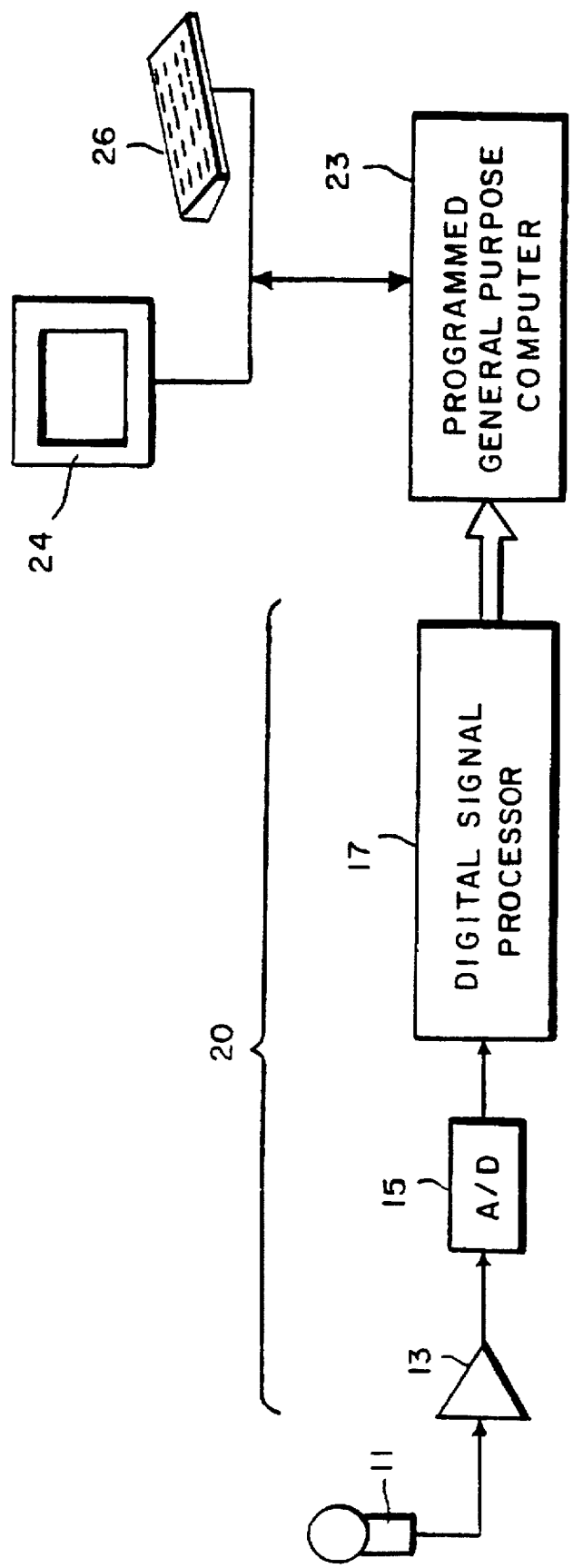
FIG. 1 is a block diagram of a speech recognition system in accordance with the present invention.

In common with many prior art systems, the preferred embodiment of the system of the present invention operates by first transducing acoustic speech waveforms to obtain corresponding electrical signals and then digitizing those signals. With reference to FIG. 1, the transducer indicated there is a microphone 11 which is connected, through a suitable preamplifier 13, to an analog-to-digital converter 15. The gain of pre-amplifier 13 is preferably adjustable under software control. As is usual in the art, the digitized speech signal is treated to obtain, at a succession of sample times, a sequence of digital values or data frames which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame. Each frame may be considered to be a multidimensional vector as understood by those skilled in the art.

Collectively, the front end circuitry is identified by reference character 20 which receives its input from microphone 11. Though the input signal processing is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g., one employing an Intel 80486 microprocessor, is provided for general system management and control functions, as well as for the processing of distance or scoring calculations. As is conventional, computer 23 incorporates a video display 24 and a keyboard 26 for providing interaction with the system user.

The raw spectral information obtained from the front end circuitry 20 is further preprocessed in the computer 23 to replace each sample or input frame with an index which corresponds to or identifies one of a predetermined set of standard or prototype spectral distributions or frames. In the particular embodiment being described, 1024 such standard frames are utilized. In the art, this substitution is conventionally referred to as vector quantization and the indices are commonly referred to as VQ indices. The preprocessing of the input data by the computer 23 also includes an estimating of the beginning and end of a word in an unknown speech input segment based on the energy level values. It should also be understood that the particular embodiment being described is a discrete word recognizer rather than a continuous speech recognizer but that the basic methods of the present invention could be applied to either type. To determine the start and end of words spoken by the user, the input circuitry preferably incorporates a software adjustable control parameter, designated the "sensitivity" value, which sets a threshold distinguishing user speech from background noise.

As indicated previously, vocabulary models are represented by sequences of standard or prototype states. Rather than representing spectral distributions, the state indices identify or correspond to probability distribution functions. The state spectral index essentially serves as a pointer into a table which identifies, for each state index, the set of probabilities that each prototype frame or VQ index will be observed to correspond to that state index. The table is, in effect, a precalculated mapping between all possible frame indices and all state indices. Thus, for comparing a single frame and single state, a distance measurement or a measure of match can be obtained by directly indexing into the tables using the respective indices and combining the values obtained with appropriate weighting. It is thus possible to build a table or array storing a distance metric representing the closeness of match of each standard or prototype input frame with each standard or prototype model state.

As is understood by those skilled in the art, the distance or likelihood values which fill the tables can be generated by statistical training methods. Various such training methods are known in the art and, as they do not form a part of the present invention, they are not described in further detail herein. Rather, for the purposes of the present invention, it is merely assumed that there is some metric for determining degree of match or likelihood of correspondence between input frames and the states which are used to represent vocabulary models. A preferred system for precalculating and storing a table of distance measurements is disclosed in co-assigned U.S. Pat. No. 5,546,499 issued Aug. 13, 1996 to Thomas Lynch, Vladimir Sejnoha and Thomas Dinger, and entitled Speech Recognition System Utilizing Precalculated Similarity Measurements. The disclosure of that application is incorporated herein by reference.

As is understood by those skilled in the art, natural variations in speaking rate require that some method be employed for time aligning a sequence of frames representing an unknown speech segment with each sequence of states representing a vocabulary word. This process is commonly referred to as time warping. The sequence of frames which constitute the unknown speech segment taken together with a sequence of states representing a vocabulary model in effect define a matrix and the time warping process involves finding a path across the matrix which produces the best score, e.g., least distance or cost. The distance or cost is typically arrived at by accumulating the cost or distance values associated with each pairing of frame index with state index as described previously with respect to the VQ (vector quantization) process.

As is also understood by those skilled in the art, the final comparing of an unknown speech segment with competing vocabulary models must be highly accurate if the procedure is to discern between similar and competing vocabulary models in a system having a large vocabulary. High accuracy comparisons are computationally intensive, even using vector quantization techniques, since a large number of possible paths across the matrix must be explored. Accordingly, in order to reduce the number of high accuracy comparisons which must be performed, the apparatus of the present invention preferably also utilizes a succession of screening steps to preselect candidates. Such preselection processes are known in the art. It may be noted that the time warping functions and the pre-screening function are both facilitated by the availability of precalculated distance measurements, as is the final and most precise comparison of an input utterance with candidate word models. A preferred system for preselection is described in co-assigned U.S. Pat. No. 5,386,492 issued Jan. 31, 1995 to Wilson et al.

Preferably the system can provide a plurality of models for each vocabulary word and, preferably also, the system incorporates means for improving the training of models during use. A preferred form of automatic training is disclosed in co-assigned U.S. Pat. No. 5,127,055 issued Jun. 30, 1992 to Leah S. Larkey. The automatic training is based upon how often each model is involved in a correct and incorrect recognitions. In the particular version employed in its embodiment being described, up to eight models can be available for a given word. If improved samples based upon actual use by a particular user are available, they are added and less well performing models are deleted.

Figure 2:
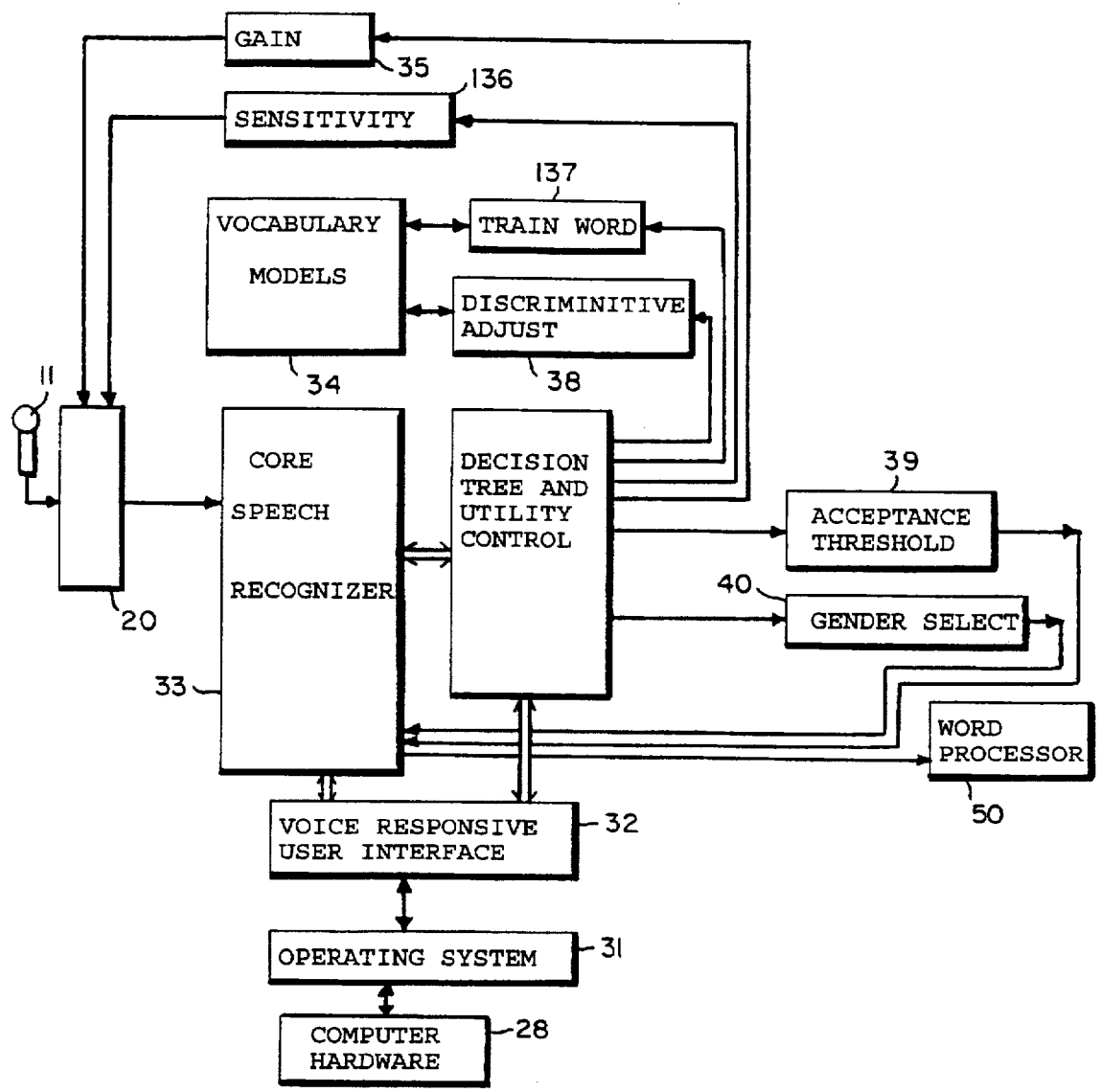
FIG. 2 is a diagram illustrating the relationship of various software components employed in the speech recognition system.

In accordance with one aspect of the present invention, the software portion of the system is organized into various modules, not all of which are operative at any given time. Referring now to FIG. 2, the operating system for the computer hardware 28 is designated generally by reference character 31. The operating system may, for example, be the Windows operating system available from Microsoft Corporation of Bellevue, Washington. A voice responsive user interface operating in conjunction with the Windows operating system is designated by reference character 32. The presently preferred form of user interface is that disclosed in copending, co-assigned application Ser. No. 08/128,990, filed Sep. 29, 1993, by William F. Cote et al., and entitled System For Controlling Multiple User Application Programs By Spoken Input. The disclosure of that application is incorporated herein by reference.

The software which performs the basic comparison and pattern recognition functions is generally designated by reference character 33, while the collection of vocabulary models is designated by reference character 34. As is also understood by those skilled in the art, speech recognition systems are for the most part employed to provide translations of spoken input to another user application program. For example, the user may wish to conduct wordprocessing, spreadsheet or report generation functions utilizing speech input rather than keyboard input. By way of example, a word processing program is shown and designated by reference character 50. The system also incorporates various utility program modules which are called into play as needed as described hereinafter. Utility program modules for adjusting gain and sensitivity are indicated by reference characters 35 and 36, respectively. The utility for training up vocabulary models from user provided spoken samples is indicated at reference character 37. As is understood by those skilled in the art, it may also be useful to train models of noises which commonly occur in the user's environment. When the system then recognizes a sound as being an unwanted noise rather than a spoken word, the translation can be designated as a null or no action code so that no input is provided to the application program, e.g. the word processor 50.

As is described in greater detail hereinafter, it is sometimes useful to improve the discrimination between an identified pair of words and a utility program for performing that function is indicated at reference character 38. Utility program modules for setting acceptance threshold level and for designating gender are indicated by reference characters 39 and 40, respectively. As is understood by those skilled in the art, the utility program modules operate to modify or adjust parameters and/or model data which is essentially a part of the speech recognition system itself and which affects or determines ongoing operational characteristics.

As indicated earlier, a technically sophisticated user may be able to reliably identify a problem in the ongoing operation of the speech recognizer and to invoke, typically through keyboard commands, an appropriate utility program for making the necessary adjustments in the ongoing operating parameters of the recognizer. However, for most users who are merely interested in performing the intended work, e.g., word processing, the choice of utility and action to take is often confusing and incomprehensible. In accordance with the present invention, there is provided a decision tree and utility control module as indicated at reference character 52. The functioning of this program module is illustrated in the flowchart of FIG. 3.

Figure 3:
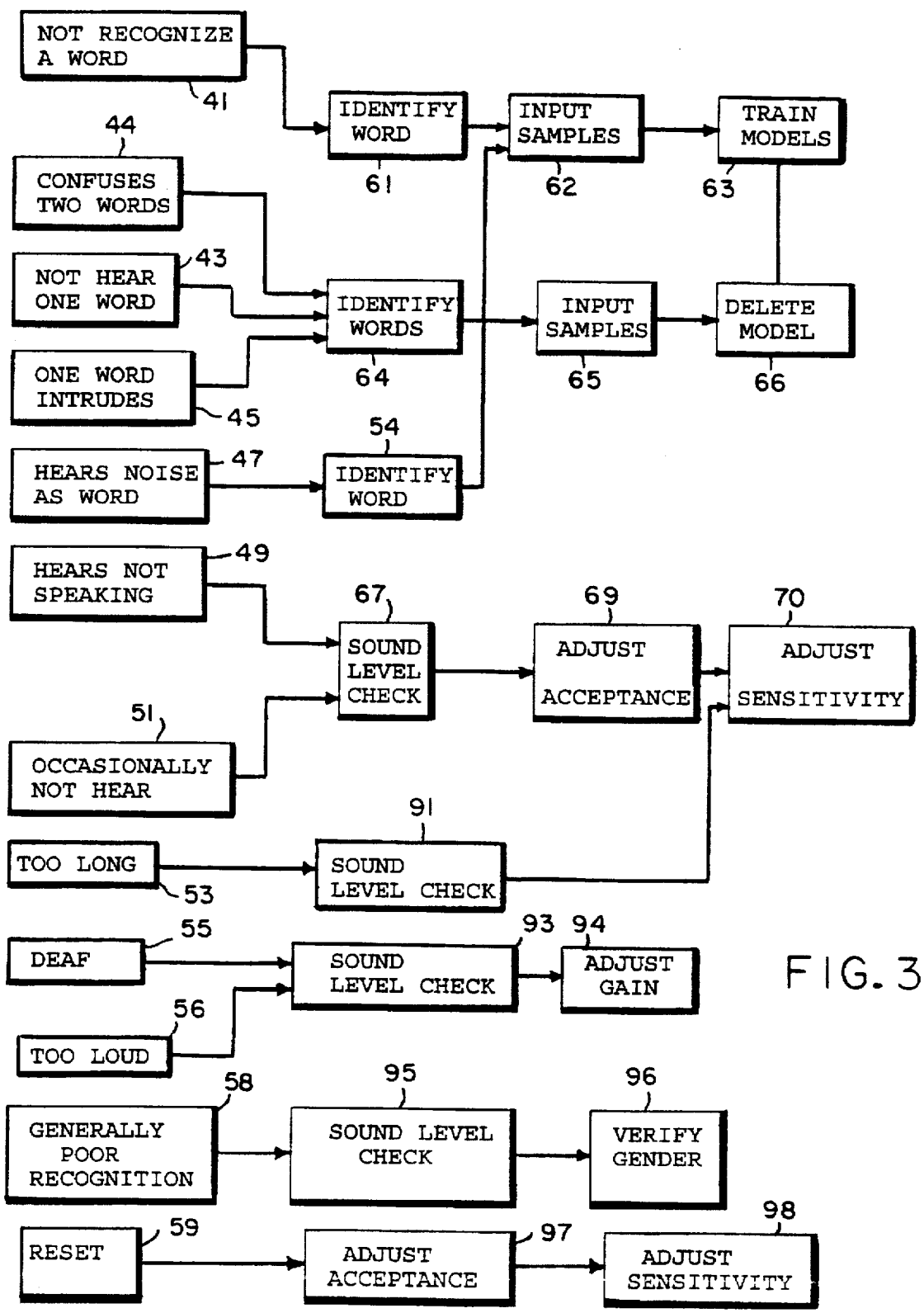
FIG. 3 is a flow chart illustrating the operation of a decision tree and utility control component of the software of FIG. 2.

Referring now to the decision tree flowchart illustrated in FIG. 3, the blocks along the left hand side represent different problem descriptions which a user can choose and thereby invoke an adaptation or tuning procedure in accordance with the present invention. As will be seen, some of the problem definitions are merely different approaches or wordings for essentially the same problem and solution, while other problem statements, though appearing similar, actually invoke different procedures.

If the user chooses problem description 41, i.e., that the system does NOT RECOGNIZE A WORD, the user is prompted to identify that word from the vocabulary as indicated at block 61. He will also be guided, at block 62, into speaking samples of the identified word. The samples are then utilized by the training module or utility program 63 to generate new models of the vocabulary word which can be utilized in subsequent recognition operations. In the preferred embodiment of the present invention, up to eight models can be provided for each vocabulary word. When new models beyond the eight are generated, the pre-existing model which has been used least often in providing correct results is deleted as described in greater detail in the previously identified U.S. Pat. No. 5,127,055.

If the user chooses problem description 44, i.e., that the system consistently CONFUSES TWO WORDS, the user is prompted to identify the words, as indicated by reference character 48, but then a somewhat different procedure is initiated, as indicated by reference characters 64, 65 and 66, to improve the distinguish ability of the words. This procedure is illustrated in greater detail in FIG. 4.

Figure 4:
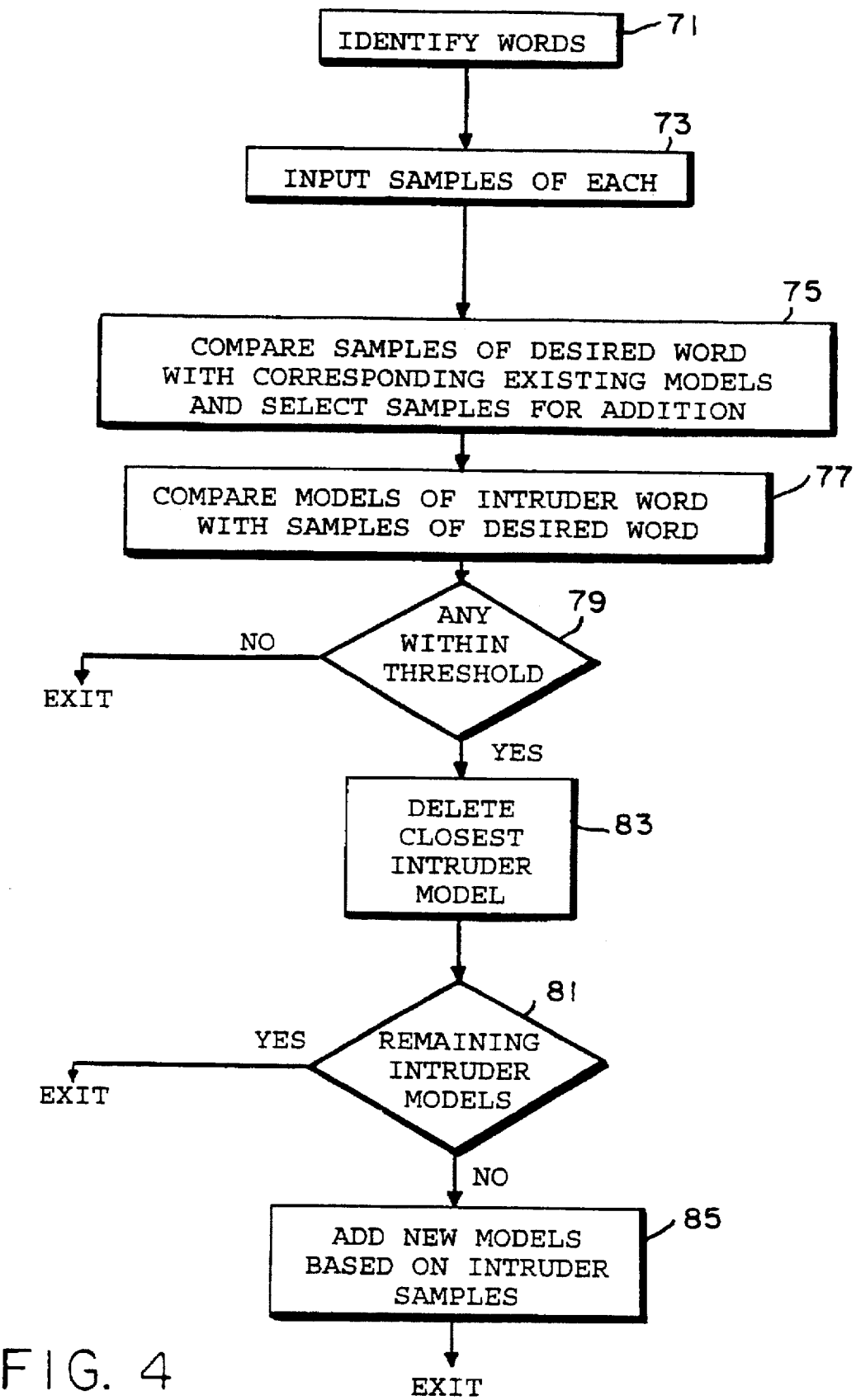
FIG. 4 is a flow chart illustrating the operation of a software component which improves discrimination between a pair of words.

As illustrated in FIG. 4, the user is first prompted to identify the words which are being confused, as represented at block 71, and is then prompted (block 73) to input a preselected number of samples, e.g., three, of each of the words. As indicated at block 75, the system then compares the samples of the desired word with corresponding existing models for that word and selects, for addition to the collection of models, those sample-derived new models which are closest to the existing models. Again, if the total number of models exceeds the number provided for in the system, e.g., eight, the least used pre-existing model is deleted as described previously.

In accordance with one aspect of the present invention, it has been found that merely adding newly trained models for the intruder is not typically effective in curing the problems encountered by a user who perceives two words as being confused. Rather, the problem originates with the existence and inclusion of models which do not well represent the intruder word, particularly as compared with the desired word. Accordingly, all existing models of the intruder word are compared with the samples of the desired word at block 77, and, if any existing model of the intruder is within a preselected threshold distance or metric of the desired word as indicated by the "YES" output of decision diamond 79, the closest one is deleted at block 83.

If, after the deletion, there are no remaining intruder word models, as indicated by the "NO" output of decision diamond 81, the newly obtained samples of the intruder word are used to generate models as indicated at block 85. If multiple models for the intruder word exist at the start of the procedure, the newly obtained samples are not used.

Referring back to FIG. 3, if the user selects the problem identified as one that where in ONE WORD INTRUDES (block 45), essentially similar procedures are invoked. Likewise, if the user selects the problem (43) that the system DOES NOT HEAR ONE word, essentially similar procedures are invoked but the noise models are considered as possible intruders since, as described previously, the translation of a noise model is a null or "no action". Thus, to allow the desired word to be recognized, it may be necessary to delete an intruding noise model in accordance with the procedures described with reference to FIG. 4.

If the system is hearing a common noise as a word, as indicated by reference character 47, the user is prompted to merely identify that it is noise that he wishes to characterize and then he is then prompted to cause the noise to occur. The model created from the sample then created is tagged as a noise model which, as indicated previously, is "recognized" in the same sense as the word, but is ignored in the sense that no translation is provided to the application program, e.g., wordprocessing, for which the user is employing the speech recognition system as an input mechanism.

If the user indicates that the system HEARS when he is NOT SPEAKING (block 49), the user is prompted to perform a sound level check, as indicated at block 67. The acceptance level is then adjusted as indicated at block 69, and likewise sensitivity level is adjusted as indicated at block 70. Essentially similar procedures are followed if the user indicates that the system occasionally does not hear him, i.e., as indicated at block 51.

If the system repeatedly reports to the user that the discrete word input is TOO LONG, the user, by identifying this problem at block 53, can be prompted to invoke the sound level check, as indicated at block 91, which is then utilized to adjust sensitivity (block 70).

If the user indicates that the system is DEAF, as indicated at block 55, he is prompted to initiate a sound level check as indicated at block 93. The gain is then adjusted as indicated at block 94. Similarly, if the user input is repeatedly identified as being TOO LOUD and the user selects that problem (block 56), he is then prompted to do a sound level check (block 93) and to adjust gain (block 94).

If the user indicates that he is obtaining generally poor recognition results, as indicated at block 58, he is prompted to first perform a sound level check as indicated at block 95 and to then designate gender as indicated at block 96. As indicated previously, the preferred embodiment of the present invention preferably provides different data transformations for model data based upon gender to obtain improved recognition results. As a final choice, the user can elect to reset parameters as indicated at block 59 in which case he is prompted to adjust the acceptance threshold, as indicated at block 97, and sensitivity is also adjusted, as indicated at block 98.

As indicated, the new setting levels are stored with the recognition program itself and employed in all future recognition, i.e., until further adjustments are made so that the ongoing performance of the recognition system is altered. Thus, by periodically invoking the decision tree mechanism, the operation of the overall system will increasingly adapt to the characteristics of a particular user and will provide better performance and higher accuracy of recognition on an ongoing basis.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A speech recognition system comprising:

input means for receiving an input utterance from a user and receiving also background noise;

a core speech recognizer which compares an input utterance with a multiplicity of trained models representing words and generates scores for each of at least some of said models, which scores represent the degree of match of the respective model with the utterance, said core speech recognizer having a plurality of adjustable parameters including a sensitivity parameter which controls a discrimination level defining sound levels accepted as an utterance rather than background noise;

a first utility program module which responds to user input to change said sensitivity parameter;

a training utility program module which responds to user input to further train a selected word model on the basis of a particular user's voice characteristics;

a discrimination improving utility program module which responds to user input identifying a desired word and an intruder word to improve the differentiation in match between the respective models representing the desired and intruder words; and a decision tree and utility controlling program module which can be invoked by a user confronting problems during running of said core speech recognizer and which utilizes input provided by the user to traverse said decision tree and to initiate corresponding ones of said utility program modules and thereby alter the on-going operating behavior of said core speech recognizer.

2. A speech recognition system as set forth in claim 1 wherein said discrimination improving utility program module deletes the model representing the intruder word which is closest to the models representing the desired word.

3. A speech recognition system as set forth in claim 2 wherein said discrimination improving module creates a new model of the intruder word if the only remaining pre-existing model for that word is deleted.

4. A speech recognition system as set forth in claim 2 wherein said discrimination improving utility program module creates additional models of the desired word from user generated samples.

5. A speech recognition system comprising:

input means for receiving an input utterance from a user and receiving also background noise;

a core speech recognizer which compares an input utterance with a multiplicity of trained word models and generates scores for each of at least a portion of said models, which scores represent the degree of match of the respective model with the utterance, said core speech recognizer having a plurality of adjustable parameters including:

a sensitivity parameter which controls a discrimination level between background noise and sound levels accepted as an utterance, and a threshold parameter which functions to exclude models having scores worse than the threshold parameter;

a plurality of primary utility program modules which respond to user input to change system parameters including said sensitivity parameter; and said threshold parameter;

a training utility program module which responds to user input to train a selected word model on the basis of a particular user's voice characteristics; and a decision tree and utility controlling program module which can be invoked by a user confronting problems during running of said core speech recognizer and which utilizes user input to traverse said decision tree and to initiate a corresponding one of said utility program modules and thereby alter the on-going operating behavior of said core speech recognizer.

6. A speech recognition system comprising:

input means, including means for providing an adjustable amplitude gain, for receiving an input utterance from a user and receiving also background noise;

a core speech recognizer which compares an input utterance with a multiplicity of trained models representing words and generates scores for each of at least some of said models, which scores represent the degree of match of the respective model with the utterance, said core speech recognizer having a plurality of adjustable parameters including:
 a sensitivity parameter which controls a discrimination level between background noise and sound levels accepted as an utterance, and
 a threshold parameter for scores which functions to exclude presumably unlikely models;

a plurality of primary utility program modules which respond to user input to change system parameters including
 said adjustable gain;
 said sensitivity parameter; and
 said threshold parameter;

a training utility program module which responds to user input to train a selected word model on the basis of a particular user's voice characteristics;

a discrimination improving utility program module which responds to user input identifying a desired word and an intruder word to improve the separation between the respective models representing the desired and intruder words; and a decision tree and utility controlling program module which can be invoked by a user confronting problems during running of said core speech recognizer and which utilizes input provided by the user to traverse said decision tree and to initiate a corresponding one of said utility program modules and thereby alter the on-going operating behavior of said core speech recognizer.

7. A speech recognition system as set forth in claim 6 wherein said discrimination improving utility program module deletes the model representing the intruder word which is closest to the models representing the desired word.

8. A speech recognition system as set forth in claim 7 wherein said discrimination improving module creates a new model of the intruder word if the only remaining pre-existing model for that word is deleted.

* * * * *